United States Patent
Komatsu et al.

(10) Patent No.: US 10,794,416 B2
(45) Date of Patent: Oct. 6, 2020

(54) TENSIONING DEVICE

(71) Applicant: TOHNICHI MFG. CO., LTD., Tokyo (JP)

(72) Inventors: Kyoichi Komatsu, Tokyo (JP); Hiroshi Tsuji, Tokyo (JP); Osamu Tsuji, Tokyo (JP); Seiji Ito, Tokyo (JP)

(73) Assignee: TOHNICHI MFG. CO., LTD., Tokyo (JP)

( * ) Notice: Subject to any disclaimer, the term of this patent is extended or adjusted under 35 U.S.C. 154(b) by 0 days.

(21) Appl. No.: 16/480,206

(22) PCT Filed: Oct. 10, 2018

(86) PCT No.: PCT/JP2018/037743
§ 371 (c)(1),
(2) Date: Jul. 23, 2019

(87) PCT Pub. No.: WO2019/167327
PCT Pub. Date: Sep. 6, 2019

(65) Prior Publication Data
US 2020/0173484 A1 Jun. 4, 2020

(30) Foreign Application Priority Data

Feb. 28, 2018 (JP) .................................. 2018-035403
Jul. 31, 2018 (JP) .................................. 2018-143188

(51) Int. Cl.
*F16B 31/02* (2006.01)
*F16B 43/00* (2006.01)
*B25B 29/02* (2006.01)

(52) U.S. Cl.
CPC ............ *F16B 31/028* (2013.01); *B25B 29/02* (2013.01); *F16B 43/00* (2013.01); *F16B 31/02* (2013.01)

(58) Field of Classification Search
CPC ........ F16B 31/02; F16B 31/028; F16B 43/00; G01L 5/243; B25B 29/02
(Continued)

(56) References Cited

U.S. PATENT DOCUMENTS 5,913,647 A * 6/1999 Hodge .................. F16B 31/028
                                                   116/DIG. 34
6,135,687 A * 10/2000 Leek ...................... F16B 31/028
                                                        411/10
(Continued)

FOREIGN PATENT DOCUMENTS

CN          101169380 A      4/2008
CN          202562687 U     11/2012
(Continued)

OTHER PUBLICATIONS

China Patent Office, "Office Action for Chinese Patent Application No. 201880009170.2," dated Mar. 20, 2020.
(Continued)

*Primary Examiner* — Roberta S Delisle
(74) *Attorney, Agent, or Firm* — Manabu Kanesaka

(57) ABSTRACT

An error of an axial force detection is reduced by tensioning a bolt with a tensioning device engaged with a part of the bolt, different from a shaft portion of the bolt. A tensioning device is configured to apply upward tension to a bolt fastened to a fastened member H, and fitted with a washer. A first male thread portion is formed on an outer circumferential surface of the washer. The tensioning device includes a connection member having a first female thread portion to be engaged with the first male thread portion, a tensioning mechanism for tensioning the connection member in a state where the first male thread portion is engaged with the first female thread portion, and a tension bearer which is disposed around an outer circumference of the connection member, and bears a reaction force applied from
(Continued)

the fastened member H in tensioning performed by the tensioning mechanism.

9 Claims, 13 Drawing Sheets

(58) Field of Classification Search
USPC .................................................. 411/8, 9, 10
See application file for complete search history.

(56) References Cited

U.S. PATENT DOCUMENTS

| | | | |
|---|---|---|---|
| 2005/0165397 A1* | 7/2005 | Faus ..................... | B23P 19/067 81/57.38 |
| 2009/0084197 A1 | 4/2009 | Lohr | |
| 2016/0297057 A1* | 10/2016 | Ribault ................... | B25B 29/02 |
| 2020/0171636 A1* | 6/2020 | Tsuji ....................... | B25B 29/02 |
| 2020/0171637 A1* | 6/2020 | Komatsu ................ | B25B 29/02 |

FOREIGN PATENT DOCUMENTS

| | | |
|---|---|---|
| CN | 203772637 U | 8/2014 |
| CN | 107462462 A | 12/2017 |
| JP | S56-039612 U | 4/1981 |
| JP | H08-166299 A | 6/1996 |
| JP | H10-170362 A | 6/1998 |
| JP | 4028254 B2 | 12/2007 |
| TW | 455682 B | 9/2001 |
| TW | 571077 B | 1/2004 |
| TW | 201544719 A | 12/2015 |

OTHER PUBLICATIONS

PCT/ISA/210, "International Search Report for International Application No. PCT/JP2018/037743," dated Jan. 8, 2019.

* cited by examiner

TENSIONING DEVICE

RELATED APPLICATIONS

The present application is National Phase of International Application No. PCT/JP2018/037743 filed Oct. 10, 2018, and claims priority from Japanese Applications No. 2018-035403, filed Feb. 28, 2018 and No. 2018-143188, filed Jul. 31, 2018, the disclosure of which is hereby incorporated by reference herein in its entirety.

TECHNICAL FIELD

The present invention relates to a tensioning device which applies tension upwardly to a bolt fastened to a fastened member.

BACKGROUND ART

Machines such as automobiles, and structures such as bridges are assembled through fastening with screws. The strength of the screw as the fastener largely relies on the tightening force. Meanwhile, monitoring of the fastening force applied to the bolt fasteners is performed by measuring the torque and the rotation only during tightening of them. After the tightening, there are seldom chances of controlling the tightening force. However, there may cause the bolt to be loosened owing to unexpected external force in operation of the machine to lower the tightening force. This may considerably increase the risk of fatigue fracture. It is therefore necessary to pay attention to detection of the tightening force applied to the fastened bolt in order to prevent the rupture accident of the bolt, and improve reliability of the screw fastener.

Patent Literature 1 discloses the method of detecting tightening force of a bolt-nut fastener, the bolt-nut fastener being configured so that the bolt is inserted into an insertion hole of a fastened member and the nut is threadly engaged with the male thread portion of the bolt inserted into the insertion hole for fastening the fastened member to be clamped therebetween, wherein the male thread portion of the bolt protruding from the upper surface is subjected to tension to detect the transition point of the spring constant of the bolt, and the tension force at the transition point is determined as the tightening force.

CITATION LIST

Patent Literature

Patent Literature 1: Japanese Patent No. 4028254

SUMMARY OF INVENTION

Technical Problem

The method of detecting the tightening force as disclosed in Patent Literature 1 requires the female thread portion of the tensioning member to be threadly engaged with the male thread portion of the bolt protruding from the upper surface of the nut. Because of a small shaft diameter of the bolt, and a short extension length of the bolt shaft protruding from the upper surface of the nut, the circumferential length of the thread portion to be threadly engaged may be insufficient. The insufficient circumferential length of the thread portion to be threadly engaged may plastically deform the thread ridge during tensioning to the bolt via the tensioning member, causing the increase of the axial force detection error.

It is an object of the present invention to reduce the error of the axial force detection or the like by tensioning the bolt with a tensioning device threadly engaged with a part of the bolt, which is different from the shaft portion of the bolt.

Solution to Problem

In order to solve the above-described problem, the invention provides:

(1) A tensioning device which applies upward tension to a bolt fastened to a fastened member and insertedly fitted with a washer having a first male thread portion formed on an outer circumferential surface. The tensioning device includes a connection member having a first female thread portion to be threadly engaged with the first male thread portion, a tensioning mechanism which tensions the connection member while having the first male thread portion threadly engaged with the first female thread portion, and a tension bearer which is disposed around an outer circumference of the connection member, and bears a reaction force applied from the fastened member in tensioning performed by the tensioning mechanism.

(2) In the tensioning device according to the above-described (1), the tensioning mechanism includes a tension rod, a bearing which rotatably supports the tension rod around a vertically extending shaft portion, and a rotation mechanism serving to rotate the tension rod around the shaft portion. A convex portion having a second male thread portion formed on an outer circumferential surface is disposed on an upper end of the contact member. A hollow portion having a second female thread portion to be threadly engaged with the second male thread portion on an inner circumferential surface is formed in a lower end of the tension rod.

(3) In the tensioning device according to the above-described (2), the tension bearer is vertically interposed between the bearing and the fastened member.

(4) In the tensioning device according to the above-described (2) or (3), the convex portion has an axial diameter which is substantially the same as that of the bolt, and a friction torque reducing agent for reducing a friction torque is applied to the second male thread portion and the second female thread portion.

(5) In the tensioning device according to any one of the above-described (1) to (4), a tensile strength of the connection member is higher than that of the bolt.

(6) In the tensioning device according to any one of the above-described (1) to (5), the first male thread portion has a length equal to or longer than a single round of an outer circumferential surface of the washer.

(7) In the tensioning device according to the above-described (1) or (2), in tensioning performed by the tensioning mechanism, a protection plate intervenes between the tension bearer and the fastened member.

(8) In the tensioning device according to the above-described (7), a contact area of the protection plate with the fastened member is adjusted so that a deformation amount S1 of the fastened member just below the washer before starting tensioning by the tensioning mechanism is substantially equalized to a deformation amount S2 of the fastened member just below the protection plate after starting tensioning by the tensioning mechanism.

(9) In the tensioning device according to the above-described (1) or (2), a contact area of the tension bearer with the fastened member is adjusted so that a deformation amount S1 of the fastened member just below the washer before starting tensioning by the tensioning mechanism is substantially equalized to a deformation amount S2 of the fastened member just below the tension bearer after starting tensioning by the tensioning mechanism.

Advantageous Effects of Invention

According to the present invention, the female thread portion of the tensioning device is threadly engaged with the male thread portion formed on an outer circumferential surface of the washer so as to ensure the bolt to be tensioned (in other words, the bolt is tensioned via the washer). This makes it possible to suppress deterioration in accuracy of detection such as the axial force detection owing to insufficient circumferential length of the threadly engaged thread portion.

DESCRIPTION OF EMBODIMENTS

Figure 1:
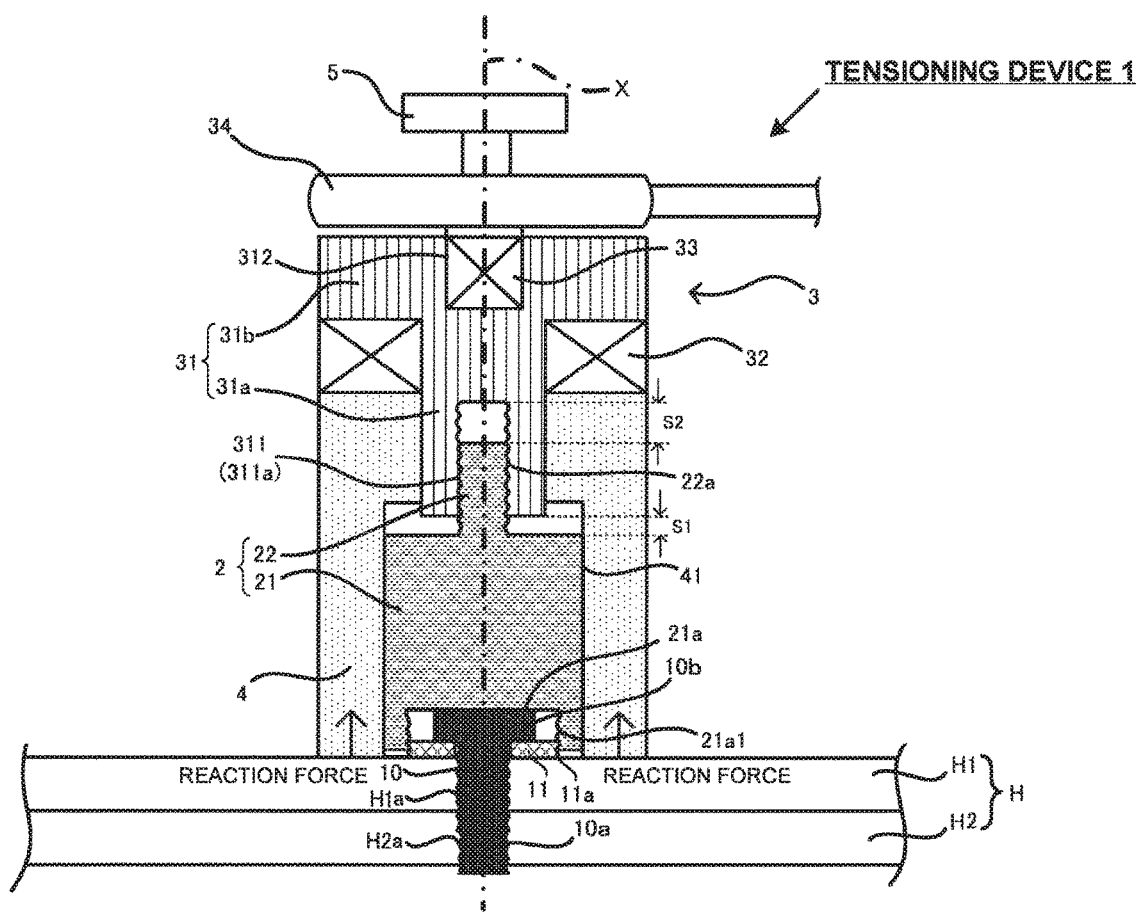
FIG. 1 is a schematic view of a tensioning device.

Embodiments of the present invention will be described referring to the drawings.

First Embodiment

A tensioning device of this embodiment serves to fasten a fastened member with a bolt and a washer, and applies tension to the bolt via the washer while holding the upper surface of the fastened member. The tensioning device is used for detection of the axial force of the bolt (in other words, fastening force of the bolt), and detection of the spring constant of the fastened member to which the bolt is fastened. The basic concept of the axial force detection is similar to the one disclosed in Japanese Patent No. 4028254. In the following embodiments, structures and operations of the tensioning devices will be described by taking the axial force detection as an example.

Figure 2:
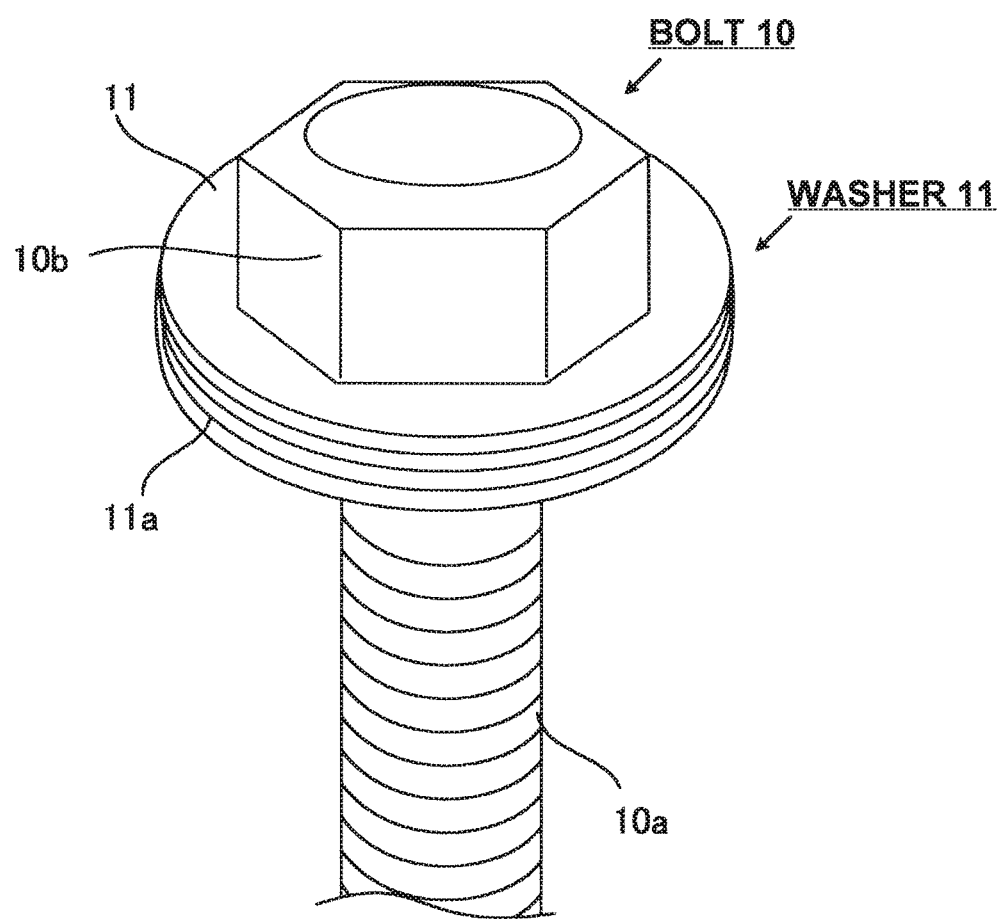
FIG. 2 is a perspective view showing a bolt and a washer.

FIG. 1 is a schematic view of a tensioning device of the embodiment in the state just after starting tensioning the washer. A plurality of members constituting the tensioning device are marked with mutually different hatchings so as to clarify each boundary among those members. FIG. 2 is a perspective view showing the bolt and the washer.

A tensioning device 1 includes a connection member 2, a tensioning mechanism 3, a tension bearer 4, and a handle 5. A vertically extending rotation axis X of the tensioning device 1 is indicated by an alternate long and short dashed line.

The connection member 2 includes a column portion 21 and a convex portion 22 formed on an upper surface of the column portion 21. A vertically extending connection member hollow portion 21a is formed in a lower end of the column portion 21. A first female thread portion 21a1 extending around the rotation axis X is formed on a circumferential surface of the connection member hollow portion 21a. The convex portion 22 is formed to have a column shape with a diameter smaller than that of the column portion 21. A second male thread portion 22a extending around the rotation axis X is formed on the outer circumferential surface of the convex portion. The connection member 2 may be made of a material with higher tensile strength than the bolt 10. This makes it possible to prevent plastic deformation of the connection member 2 in the axial force detection.

The tensioning mechanism 3 includes a tension rod 31, a bearing 32, an angle drive 33 (corresponding to a rotation mechanism), and a wrench 34 (corresponding to a rotation mechanism). The tension rod 31 includes a columnar small-diameter rod portion 31a and a columnar large-diameter rod portion 31b. An upper end portion of the small-diameter rod portion 31a and a lower end portion of the large-diameter rod portion 31b are connected to each other. The small-diameter rod portion 31a and the large-diameter rod portion 31b are integrally formed.

A vertically extending tension rod hollow portion 311 is formed in a lower end of the small-diameter rod portion 31a. A second female thread portion 311a extending around the rotation axis X is formed on an inner circumferential surface of the tension rod hollow portion 311. A mount opening 312 is formed in an upper end of the large-diameter rod portion 31b.

The bearing 32 is formed as a thrust bearing for rotatably supporting the small-diameter rod portion 31a of the tension rod 31. An upper end surface of the bearing 32 comes in contact with a lower end surface of the large-diameter rod portion 31b of the tension rod 31. A lower end surface of the bearing 32 comes in contact with an upper end surface of the tension bearer 4. That is, the bearing 32 is vertically interposed between the large-diameter rod portion 31b and the tension bearer 4.

The angle drive 33 is detachably fitted with the mount opening 312 of the large-diameter rod portion 31b. Rotating the angle drive 33 allows the tension rod 31 to rotate around the rotation axis X. The angle drive 33 may be rotated using the handle 5 and the wrench 34. The embodiment is structured so that the connection member 2 moves up by the amount corresponding to the thread pitch of the second female thread portion 311a of the tension rod 31 upon a single round rotation of the tension rod 31 around the rotation axis X using the wrench 34. In the embodiment, the tension rod 31 is rotated using the angle drive 33, the handle 5, and the wrench 34. The present invention is not limited to the above-described example. It is possible to use any other drive means capable of generating power for rotating the tension rod 31.

The wrench 34 is a horizontally long shaped so as to generate the torque larger than the one generated by the handle 5 in rotation with the same force. The wrench 34 includes a not shown angle sensor (gyro sensor, for example). The angle sensor allows measurement of the rotation amount of the tension rod 31. It is possible to attach the angle sensor directly to the tension rod 31 instead of the wrench 34.

The tension bearer 4 includes a not shown axial force detection unit for detecting the axial force. For example, a strain gauge may be used as the axial force detection unit. The strain gauge is deformed by the force applied thereto, and outputs an electrical signal in accordance with the amount of deformation. A vertically extending tension hollow portion 41 is formed in a lower end of the tension bearer 4. The connection member 2 is stored in the tension hollow portion 41. The column portion 21 of the connection member 2 is disposed along the inner circumferential surface of the tension hollow portion 41. In other words, the tension bearer 4 is disposed to surround the connection member 2.

The structure of the tensioning mechanism 3 is not limited to the above-described example. Any other structure is available so long as the connection member 2 can be moved up without being rotated in the axial force detection. For example, a concave portion with the female thread on its inner circumferential surface is formed in the upper surface of the column portion 21, and a convex portion with the male thread on its outer circumferential surface is formed on the lower end of the tension rod 31 (that is, the lower end of the small-diameter rod portion 31*a*). The convex portion is then threadly engaged with the female thread so as to apply tension to the connection member 2. It is possible to detect the axial force by hydraulically measuring the tension force and the vertical displacement instead of the rotating operation performed by the tension rod 31.

A detailed explanation will be made with respect to the bolt, the washer, and the fastened member. The bolt 10 as a hexagon head bolt includes a bolt shaft 10*a* and a bolt head 10*b*. The bolt 10 may be a dodecagon head bolt, and a square head bolt, for example (this applies to other embodiments and modified examples). The bolt shaft 10*a* has a male thread formed thereon. The washer 11 has a flat shape and its diameter set to be larger than that of the bolt 10. A circumferentially extending first male thread portion 11*a* is formed on the outer circumferential surface of the washer 11. Referring to the drawing, the first male thread portion 11*a* is formed on the entire outer circumferential surface (side surface) of the washer 11. However, the present invention is not limited to the above-described example. The first male thread portion may be partially formed on the outer circumferential surface. That is, the first male thread portion 11*a* may be partially formed on the outer circumferential surface (side surface) of the washer 11 so long as the condition 1 to be described below is satisfied (this applies to other embodiments and modified examples).

The washer 11 is vertically clamped between the bolt head 10*b* and a fastened body H1. The use of the washer 11 reduces the contact pressure to the fastened body H1 owing to increased contact area. Accordingly, the present invention is applicable even to the case where the fastened body H1 is made of the low strength material (aluminum, for example).

The axial force may be detected in the state where the first male thread portion 11*a* of the washer 11 is threadly engaged with the first female thread portion 21*a*1 of the connection member 2. As the first male thread portion 11*a* is formed on the outer circumferential surface of the washer 11 which radially and outwardly projects from the bolt head 10*b*, it is possible to secure sufficient circumferential length of the thread portion to be threadly engaged with the washer 11 and the connection member 2. This makes it possible to prevent deterioration in accuracy of axial force detection owing to the plastic deformation of the thread ridge in the axial force detection.

The fastened member H includes the fastened body H1 and a fastened body H2, which are vertically stacked. The fastened bodies H1 and H2 have bolt holes H1*a* and H2*a*, respectively. A female thread portion to be threadly engaged with the male thread portion of the bolt shaft 10*a* is formed on a circumferential surface of the bolt hole H2*a*. The bolt 10 inserted into the bolt hole H1*a* is threadly engaged with the bolt hole H2*a* so that the bolt 10 is fastened to the fastened member H.

Alternatively, the bolt 10 may be fastened to the fastened member H in the following manner. The bolt hole H2*a* has no female thread portion. The bolt 10 is inserted into the bolt holes H1*a* and H2*a* so that a not shown nut is threadly engaged with the bolt shaft 10*a* which protrudes downward from the end surface of the fastened member H (H2). Arbitrary kinds of nut may be employed in no restricted manner, for example, the hexagonal nut, the dodecagonal nut, and the square nut may be used (this applies to other embodiments and modified examples).

The friction torque of the bolt 10 exerted to the fastened member H is set to be larger than that of the connection member 2 exerted to the tension rod 31. That is, the friction torque between the male thread portion of the bolt shaft 10*a* and the female thread portion of the bolt hole H2*a*, which are in the fastened state is larger than the friction torque between the second male thread portion 22*a* of the convex portion 22 and the second female thread portion 311*a* of the tension rod 31, which are in the threadly engaged state. This makes it possible to prevent rotation of the bolt 10 in the axial force detection.

In the embodiment, in order to establish the above-described correlation between two different friction torques, each diameter dimension of the bolt shaft 10*a* and the convex portion 22 is set to be substantially equalized, and the friction torque of the convex portion 22 to the second female thread portion 311*a* of the tension rod 31 is reduced by applying the lubricant (corresponding to the friction torque reducing agent). There may be another method of reducing the friction torque in which the diameter of the convex portion 22 is set to be smaller than that of the bolt shaft 10*a*. However, if the diameter of the convex portion 22 becomes smaller, the stress resultant from tensioning is increased to cause the risk of damage to the convex portion 22. In this embodiment, the correlation between the different friction torques may be established by substantially equalizing the diameter dimensions of the bolt shaft 10*a* and the convex portion 22, and reducing the friction torque between the convex portion 22 and the tension rod 31 using the lubricant.

Operations of the tensioning device 1 in the axial force detection will be described on the assumption that the bolt 10 and the washer 11 are fastened to the fastened member H in the initial state. It is also assumed that the tensioning mechanism 3, the tension bearer 4, and the handle 5 are preliminarily assembled to be unitized.

The first male thread portion 11*a* of the washer 11 is threadly engaged with the first female thread portion 21*a*1 of the connection member 2 so that the connection member 2 and the washer 11 are connected.

Predetermined tensioning start conditions have to be satisfied for starting tensioning by threadly engaging the first male thread portion 11a and the first female thread portion 21a1. Followings are the predetermined tensioning start conditions (1) and (2).

(Condition 1): The first female thread portion 21a1 is threadly engaged with the first male thread portion 11a with its length equal to or longer than the single-round of the outer circumferential surface of the washer 11.

(Condition 2): A clearance is formed between the lower end of the connection member 2 and the fastened body H1.

Failing to satisfy the condition 1 causes the washer 11 to have the region where no tensile force is applied in the circumferential direction (in other words, the region which does not abut on the first female thread portion 21a1). As a result, the load is exerted in the direction different from the tensioning direction (that is, vertical direction), resulting in the risk of deteriorating accuracy of the axial force detection. Failing to satisfy the condition 1 also causes plastic deformation of the thread ridge in tensioning, resulting in the risk of deteriorating accuracy of detection such as the axial force detection.

Failing to satisfy the condition 2 may increase the detection error because the axial force is detected in the pressure contact state between the lower end of the connection member 2 and the fastened body H1.

As the height dimension of the washer 11 is smaller than that of the nut or the bolt, the length for threadly engaging the first male thread portion 11a and the first female thread portion 21a1 becomes insufficient. In the above-described state, the condition 1 cannot be satisfied. Meanwhile, the condition 2 cannot be satisfied owing to the pressure contact state between the lower end of the connection member 2 and the fastened body H1.

When the connection member 2 is rotated around the rotation axis X so as to threadly engage the first male thread portion 11a and the first female thread portion 21a1 for connection between the connection member 2 and the washer 11, the connection member 2 will threadly advance downwardly. Further rotation of the connection member 2 around the rotation axis X brings the bolt head 10b into abutment on the ceiling surface of the connection member hollow portion 21a. As a result, the connection member 2 is no longer rotatable. In the embodiment, the size of the connection member hollow portion 21a is set to satisfy the conditions 1 and 2 in abutment of the connection member hollow portion 21a on the bolt head 10b (in other words, when the connection member 2 becomes no longer threadly advanceable). Accordingly, the conditions 1 and 2 may be easily satisfied. In the case where a concave portion or a convex portion is formed on the bolt head 10b, the connection member hollow portion 21a may be formed to satisfy the conditions 1 and 2 in abutment of the concave or the convex portion on the connection member hollow portion 21a (in other words, when the connection member 2 becomes no longer threadly advanceable)(this applies to other embodiments). Alternatively, it may be formed to satisfy the conditions 1 and 2 in abutment of the upper surface of the washer 11 (including the concave or the convex portion formed on the upper surface of the washer 11, if any) on the connection member hollow portion 21a.

Then a top end of the convex portion 22 of the connection member 2 is aligned with the lower end of the tension rod hollow portion 311. At this time, the tension bearer 4 is positioned above the fastened body H1 (in other words, the tension bearer 4 and the fastened body H1 are not in contact with each other). The handle 5 is then manually rotated around the rotation axis X to threadly engage the second female thread portion 311a and the second male thread portion 22a. Further rotation of the handle 5 allows the tension rod 31 to threadly advance downwardly together with the bearing 32 and the tension bearer 4. The tension bearer 4 is then seated on the fastened body H1.

FIG. 1 shows the state just after abutment of the tension bearer 4 on the fastened body H1. In this state, a clearance S1 is formed between the lower end of the tension rod 31 and the upper end of the column portion 21. A clearance S2 larger than the clearance S1 is formed between the top end of the convex portion 22 and the upper end of the tension rod hollow portion 311.

When the tension bearer 4 is seated on the fastened body H1, the tension rod 31 cannot be rotated any further because of small torque generated by the manually operated handle 5. The manually operated wrench 34 allows further rotation of the tension rod 31. This allows the connection member 2 to move up while being kept unrotatable.

As the connection member 2 moves up, downward pressing force is applied to the tension bearer 4 from the large-diameter rod portion 31b via the bearing 32. Since the tension bearer 4 seated on the fastened body H1 cannot move down, it is clamped between the bearing 32 and the fastened body H1 which, in turn, applies reaction force to the tension bearer 4. At this time, the strain gauge outputs the electrical signal (voltage, for example), based on which the axial force may be calculated. The calculated axial force may be displayed on a not shown display unit formed on the outer circumferential surface of the wrench 34 or the tension bearer 4, for example. The clearance S2 larger than the clearance S1 is capable of preventing abutment of the convex portion 22 on the upper end of the tension rod hollow portion 311 before abutment of the column portion 21 on the small-diameter rod portion 31a. As the operation length sufficient to apply tension to the bolt 10 may be secured, the problem of incapability of axial force detection may be avoided.

As described above, the embodiment employs the method of tensioning the bolt 10 via the washer 11 through threaded engagement of the first male thread portion 11a formed on the side surface of the washer 11 with the connection member 2. It is possible to detect the axial force of the bolt irrespective of its head shape so long as the bolt allows the use of the washer. Accordingly, a plurality of bolts with differently shaped heads, for example, the hexagon head bolt, the hexagon socket bolt, the roundheaded hexagon socket bolt, and the square head bolt may be subjected to tension applied from the same tensioning device to allow the axial force detection.

As the washer 11 is designed to reduce the contact pressure and to serve as the threadly engaging member in axial force detection, another threadly engaging member different from the washer does not have to be employed for the axial force detection. This makes it possible to suppress increase in the number of components.

Second Embodiment

Figure 3:
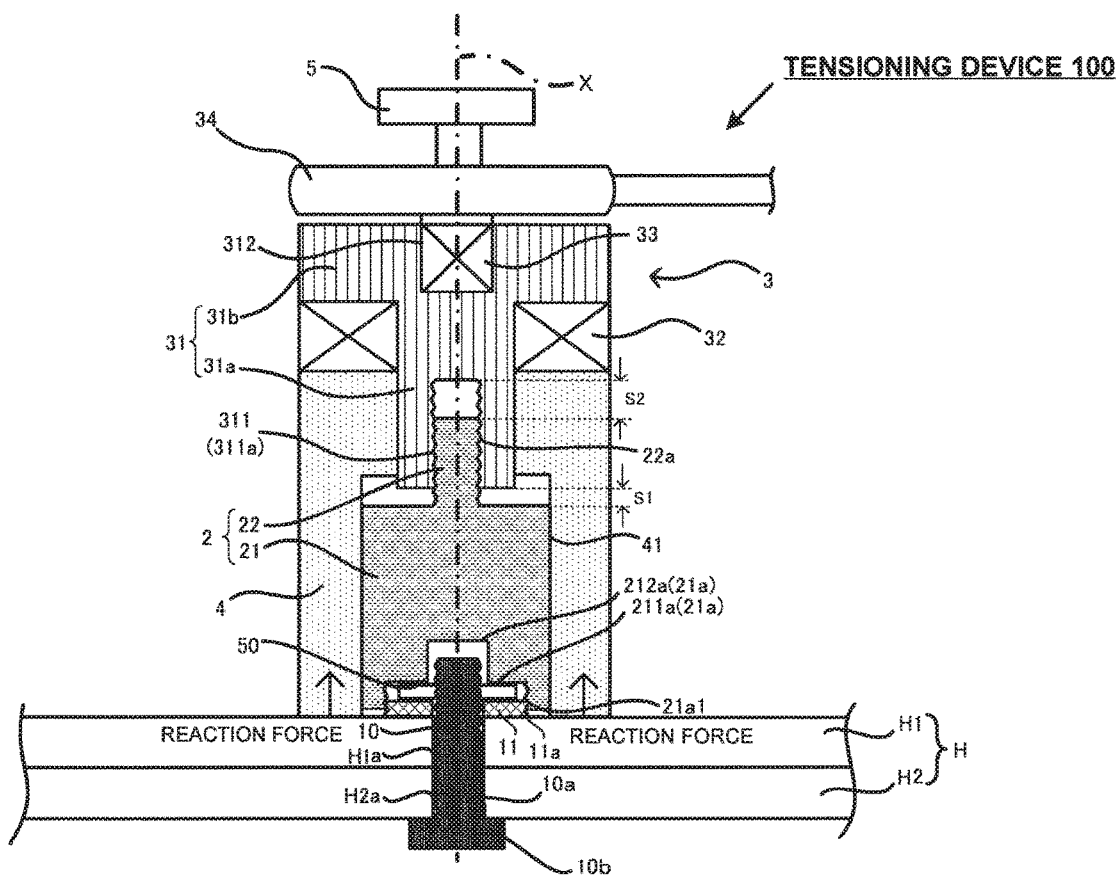
FIG. 3 is a schematic view of a tensioning device (second embodiment).

A tensioning device 100 of the present embodiment will be described referring to FIG. 3. FIG. 3 corresponding to FIG. 1 represents the state just after abutment of the tension bearer 4 on the fastened body H1. A detailed explanation of the structure similar to the one described in the first embodiment will be omitted. The bolt 10 of the embodiment has the bolt head 10b in contact with a lower surface of the fastened body H2. The top end of the bolt shaft 10a protrudes from the upper surface of the fastened body H1. That is, the bolt is in the direction opposite to the direction of the bolt of the first embodiment. The bolt holes H1a and H2a are not threaded.

The washer 11 is insertedly fitted with the protruding portion of the bolt shaft 10a, to which a nut 50 is fastened from above the washer 11. That is, the washer 11 is clamped between the fastened body H1 and the nut 50. The washer 11 has the outer diameter dimension set to be larger than that of the nut 50.

Likewise the first embodiment, the first male thread portion 11a is formed on the outer circumferential surface of the washer 11. The connection member hollow portion 21a has a vertical two-stage structure constituted by a large-diameter hollow portion 211a and a small-diameter hollow portion 212a. An upper end of the large-diameter hollow portion 211a is connected to a lower end of the small-diameter hollow portion 212a. The large-diameter hollow portion 211a includes a first female thread portion 21a1 threadly engaged with the first male thread portion 11a of the washer 11 in the axial force detection.

Each vertical dimension of the large-diameter hollow portion 211a and the small-diameter hollow portion 212a is adjusted so that the upper surface of the nut 50 (including the concave or the convex portion formed on the upper surface of the nut 50, if any) abuts on the ceiling surface of the large-diameter hollow portion 211a before abutment of the bolt shaft 10a on the ceiling surface of the small-diameter hollow portion 212a in threaded engagement between the connection member 2 and the washer 11.

The size of the connection member hollow portion 21a is set to satisfy the conditions 1 and 2 in abutment of the upper surface of the nut 50 on the ceiling surface of the large-diameter hollow portion 211a (in other words, when the connection member 2 is no longer threadly advanceable). This makes it possible to easily satisfy the conditions 1 and 2. It is possible to increase the diameter of the small-diameter hollow portion 212a to satisfy the conditions 1 and 2 in abutment of the upper surface of the washer 11 (including the concave or the convex portion formed on the upper surface of the washer 11, if any) on the ceiling surface of the large-diameter hollow portion 211a. The connection member hollow portion 21a may be formed as shown in FIG. 1 to satisfy the conditions 1 and 2 in abutment of the top end surface of the bolt shaft 10a (including the concave or the convex portion formed on the top surface of the bolt shaft 10a, if any) on the ceiling surface of the connection member hollow portion 21a. The similar advantageous effects to those of the first embodiment may be derived from the structure of this embodiment.

Third Embodiment

Figure 4:
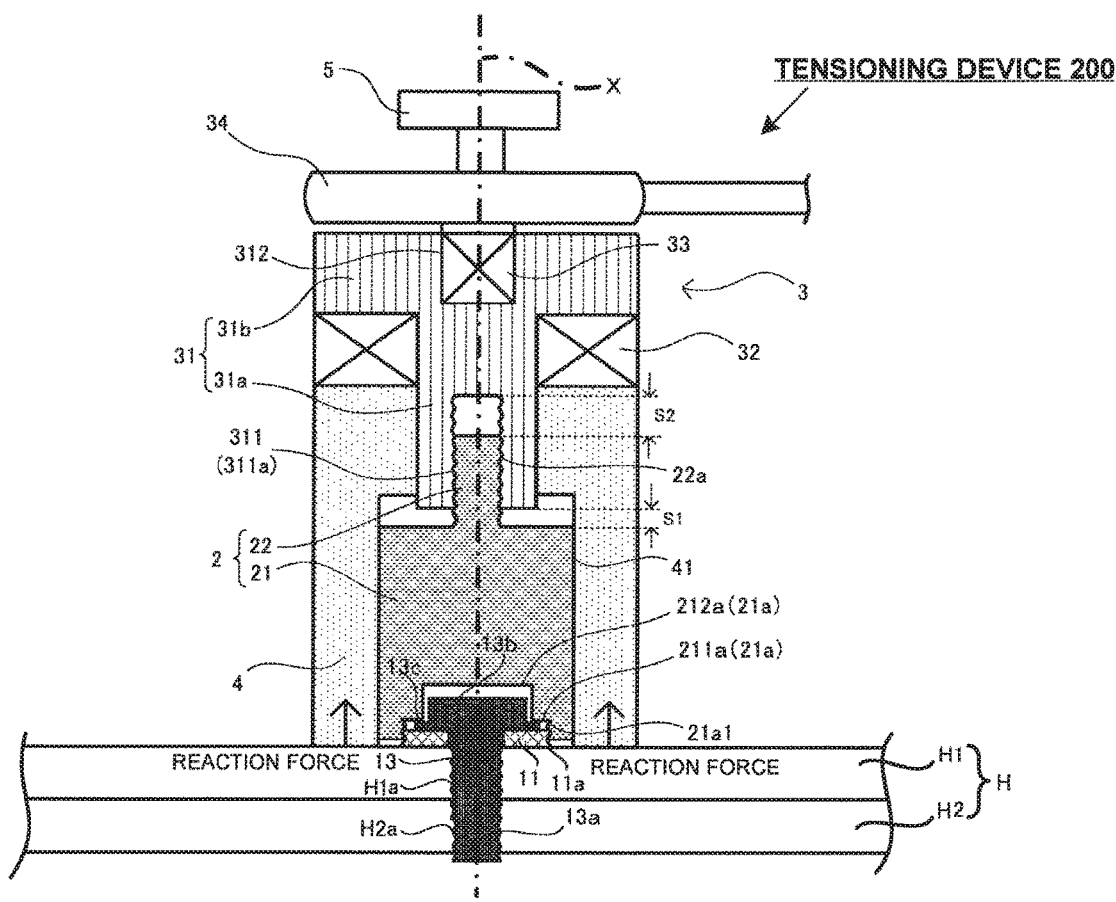
FIG. 4 is a schematic view of a tensioning device (third embodiment).
Figure 5:
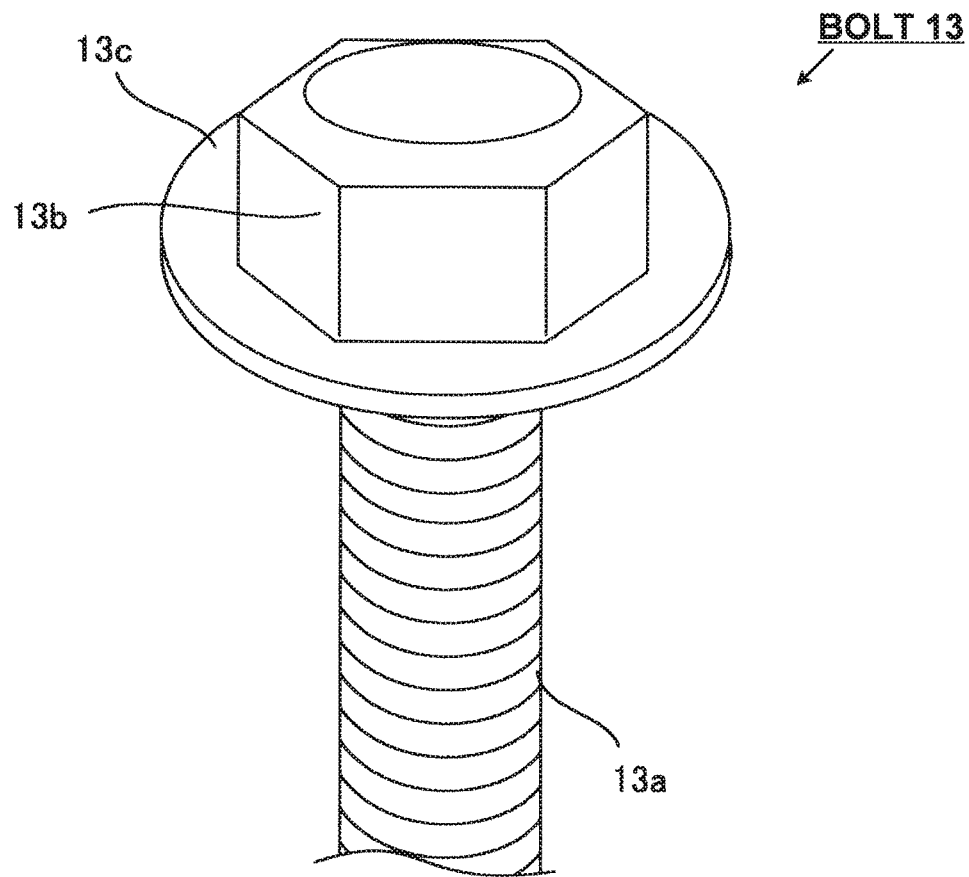
FIG. 5 is a perspective view of a bolt (third embodiment).

A tensioning device 200 according to the embodiment will be described referring to FIG. 4 and FIG. 5. FIG. 4 is a schematic view of the tensioning device according to the embodiment, representing the state just after starting tensioning the washer. The detailed explanation of the structure similar to that of the first embodiment will be omitted. FIG. 5 is a perspective view of a bolt.

The vertically extending connection member hollow portion 21a is formed in the lower end of the column portion 21. The connection member hollow portion 21a has a vertical two-stage structure constituted by the large-diameter hollow portion 211a and the small-diameter hollow portion 212a. The upper end of the large-diameter hollow portion 211a is connected to the lower end of the small-diameter hollow portion 212a. The large-diameter hollow portion 211a includes the first female thread portion 21a1 threadly engaged with the first male thread portion 11a of the washer 11 in the axial force detection.

A detailed explanation will be made with respect to the bolt, the washer, and the fastened member. A bolt 13 as a flanged hexagon head bolt includes a bolt shaft 13a, a bolt head 13b, and a bolt flange 13c. The bolt shaft 13a includes a male thread portion. The bolt flange 13c is integrally formed with the bolt head 13b while radially projecting from the lower end of the bolt head 13b. An outer diameter of the bolt flange 13c is larger than an inner diameter of the small-diameter hollow portion 212a, and smaller than an inner diameter of the large-diameter hollow portion 211a.

The washer 11 has the flat shape and its diameter dimension to be larger than that of the bolt flange 13c. The circumferentially extending first male thread portion 11a is formed on the outer circumferential surface of the washer 11. The washer 11 is vertically clamped between the bolt flange 13c and the fastened body H1.

The axial force may be detected in the state where the first male thread portion 11a of the washer 11 is threadly engaged with the first female thread portion 21a1 of the connection member 2. As the first male thread portion 11a is formed on the outer circumferential surface of the washer 11 which radially and outwardly projects from the bolt flange 13c, it is possible to secure sufficient circumferential length of the thread portion for threadly engaging the washer 11 and the connection member 2. This makes it possible to prevent deterioration in accuracy of the axial force detection owing to the plastic deformation of the thread ridge in the axial force detection.

Operations of the tensioning device 200 in the axial force detection will be described on the assumption that the bolt 13 and the washer 11 are fastened to the fastened member H in the initial state. It is also assumed that the tensioning mechanism 3, the tension bearer 4, and the handle 5 are preliminarily assembled to be unitized.

The first male thread portion 11a of the washer 11 is threadly engaged with the first female thread portion 21a1 of the connection member 2 so that the connection member 2 and the washer 11 are connected. Predetermined tensioning start conditions have to be satisfied for starting tensioning by threadly engaging the first male thread portion 11a and the first female thread portion 21a1. Followings are the predetermined tensioning start conditions (1) and (2).

(Condition 1): The first female thread portion 21a1 is threadly engaged with the first male thread portion 11a with its length equal to or longer than the single round of the outer circumferential surface of the washer 11.

(Condition 2): The clearance is formed between the lower end of the connection member 2 and the fastened body H1.

Repetitive explanations of the technical significance of the conditions 1 and 2 will be omitted.

As the height dimension of the washer 11 is smaller than that of the nut or the bolt, the length for threadly engaging the first male thread portion 11a and the first female thread portion 21a1 may be insufficient, failing to satisfy the condition 1. Meanwhile, the insufficiency may cause the pressure contact between the lower end of the connection member 2 and the fastened body H1, failing to satisfy the condition 2.

When the connection member 2 is rotated around the rotation axis X so as to threadly engage the first male thread portion 11a and the first female thread portion 21a1 for connection between the connection member 2 and the washer 11, the connection member 2 will threadly advance downwardly. Further rotation of the connection member 2 around the rotation axis X brings the upper surface of the bolt flange 13c (including the concave or the convex portion formed on the upper surface of the bolt flange 13c, if any) into abutment on the ceiling surface of the large-diameter hollow portion 211a to make the connection member 2 unrotatable. In the embodiment, each size of the large-diameter hollow portion 211a and the small-diameter hollow portion 212a of the connection member 2 may be set to satisfy the conditions 1 and 2 in abutment of the large-diameter hollow portion 211a on the bolt flange 13c (in other words, when the connection member 2 becomes no longer threadly advanceable). Accordingly, the conditions 1 and 2 may be easily satisfied. Each size of the large-diameter hollow portion 211a and the small-diameter hollow portion 212a of the connection member 2 may be set to satisfy the conditions 1 and 2 in abutment of the upper surface of the bolt head 13b (including the concave or the convex portion formed on the upper surface of the bolt head 13b, if any), or the upper surface of the washer 11 (including the concave or the convex portion formed on the upper surface of the washer 11, if any) on the connection member hollow portion 21a (in other words, when the connection member 2 becomes no longer threadly advanceable).

As described above, the embodiment employs the method of tensioning the bolt 13 via the washer 11 through threaded engagement of the first male thread portion 11a formed on the side surface of the washer 11 with the connection member 2. It is possible to use an arbitrary flanged bolt irrespective of the head shape of the bolt, so long as the bolt allows the use of the washer. Accordingly, the present invention is applicable to a plurality of flanged bolts with differently shaped heads, for example, the hexagon head bolt, the hexagon socket bolt, the roundheaded hexagon socket bolt, and the square head bolt.

Modified Example of Third Embodiment

Figure 8:
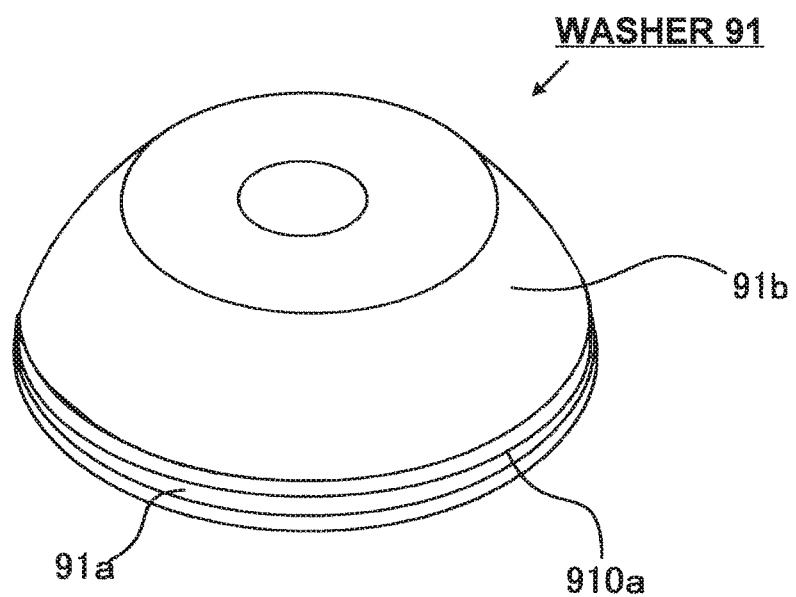
FIG. 8 is a perspective view of a washer (second modified example of the fourth embodiment).

In the third embodiment, the bolt flange 13c has a flat shape. However, the present invention is not limited to the above-described example, but applicable to any shape, instead of the flat shape, having the radially and outwardly extended diameter from the bolt head 13b in a non-restricted manner. For example, the bolt flange 13c may be formed to have a curved surface (or tapered surface) as shown in FIG. 8 to be described later. In such a case, the large-diameter hollow portion 211a and the small-diameter hollow portion 212a of the connection member 2 may be shaped to satisfy the conditions 1 and 2 in abutment on the curved surface (or tapered surface) of the bolt flange. The concave or the convex portion formed on the curved surface or the tapered surface, if any, may be considered as the abutment part.

Fourth Embodiment

Figure 6:
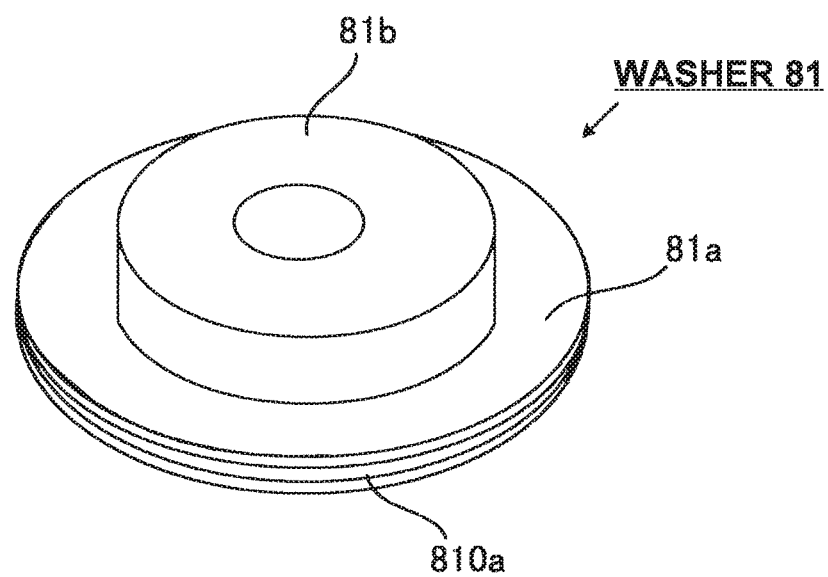
FIG. 6 is a perspective view of a washer (fourth embodiment).
Figure 7A:
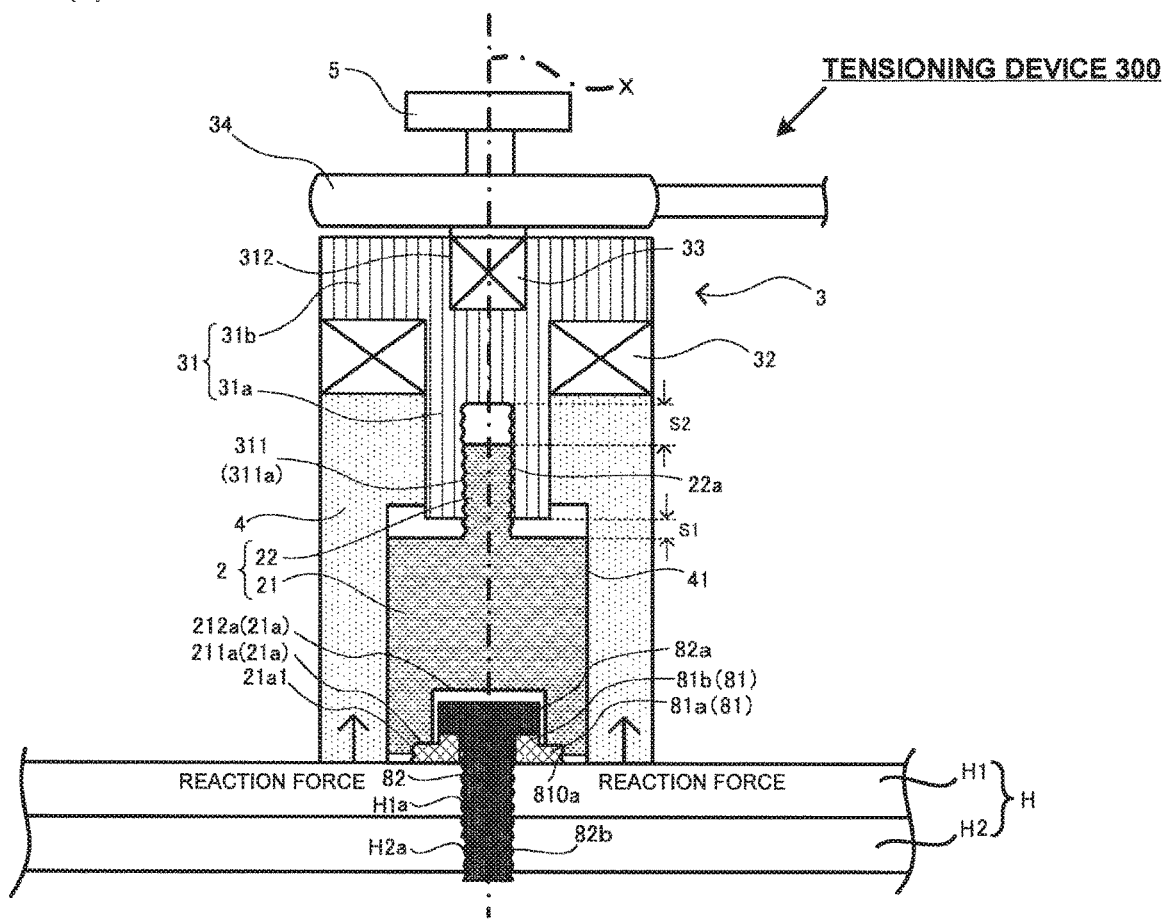
FIG. 7(a) is a schematic view of a tensioning device (fourth embodiment).

The washer and the bolt according to this embodiment are shaped differently from those of the third embodiment. FIG. 6 is a perspective view of the washer of the embodiment. FIG. 7(a) is a schematic view of a tensioning device 300 of the embodiment. The components common to those described in the third embodiment will be designated with the same reference signs. A washer 81 as a stepped washer includes a large-diameter washer portion 81a and a small-diameter washer portion 81b formed on the upper surface of the large-diameter washer portion 81a. The large-diameter washer portion 81a is integrally formed with the small-diameter washer portion 81b, and has its outer diameter dimension larger than that of the small-diameter washer portion 81b.

A bolt 82 is a hexagon head bolt including a bolt head 82a and a bolt shaft 82b (the same structure as that of the bolt 10 of the first embodiment). The washer 81 is insertedly fitted with the bolt shaft 82b, and interposed between the bolt head 82a and the fastened body H1. The small-diameter washer portion 81b comes in contact with the bolt head 82a, and the large-diameter washer portion 81a comes in contact with the ceiling surface of the large-diameter hollow portion 211a. A first male thread portion 810a is formed on an outer circumferential surface (side surface) of the large-diameter washer portion 81a. A clearance is formed between the bolt head 82a and the small-diameter hollow portion 212a.

Operations of the tensioning device 300 in the axial force detection will be described on the assumption that the bolt 82 and the washer 81 are fastened to the fastened member H in the initial state. It is also assumed that the tensioning mechanism 3, the tension bearer 4, and the handle 5 are preliminarily assembled to be unitized.

The first male thread portion 810a of the washer 81 is threadly engaged with the first female thread portion 21a1 of the connection member 2 so that the connection member 2 and the washer 81 are connected. Predetermined tensioning start conditions have to be satisfied for starting tensioning by threadly engaging the first male thread portion 810a and the first female thread portion 21a1. Followings are the predetermined tensioning start conditions (1) and (2).

(Condition 1): The first female thread portion 21a1 is threadly engaged with the first male thread portion 810a with its length equal to or longer than the single round of the outer circumferential surface of the large-diameter washer portion 81a.

(Condition 2): The clearance is formed between the lower end of the connection member 2 and the fastened body H1.

The technical significance of those conditions 1 and 2 is similar to the one described in the third embodiment, and detailed explanation thereof, thus will be omitted.

When the connection member 2 is rotated around the rotation axis X so as to threadly engage the first male thread portion 810a and the first female thread portion 21a1 for connection between the connection member 2 and the washer 81, the connection member 2 will threadly advance downwardly. Further rotation of the connection member 2 around the rotation axis X brings the upper surface of the large-diameter washer portion 81a (including the concave or the convex portion formed on the upper surface of the large-diameter washer portion 81a, if any) into abutment on the ceiling surface of the large-diameter hollow portion 211a to make the connection member 2 unrotatable. In the embodiment, each size of the large-diameter hollow portion 211a and the small-diameter hollow portion 212a of the connection member 2 is set to satisfy the conditions 1 and 2 in abutment of the large-diameter hollow portion 211a on the large-diameter washer portion 81a (in other words, when the connection member 2 becomes no longer threadly advanceable). Accordingly, the conditions 1 and 2 may be easily satisfied. Each size of the large-diameter hollow portion 211a and the small-diameter hollow portion 212a of the connection member 2 may be set to satisfy the conditions 1 and 2 in abutment of the upper surface of the bolt head 82a (including the concave or the convex portion formed on the upper surface of the bolt head 82a, if any) on the small-diameter hollow portion 212a (in other words, when the connection member 2 becomes no longer threadly advanceable).

Any other structures and effects as described in the third embodiment may be derived from this embodiment, and the repetitive explanations thereof, thus will be omitted.

First Modified Example of Fourth Embodiment

Figure 7B:
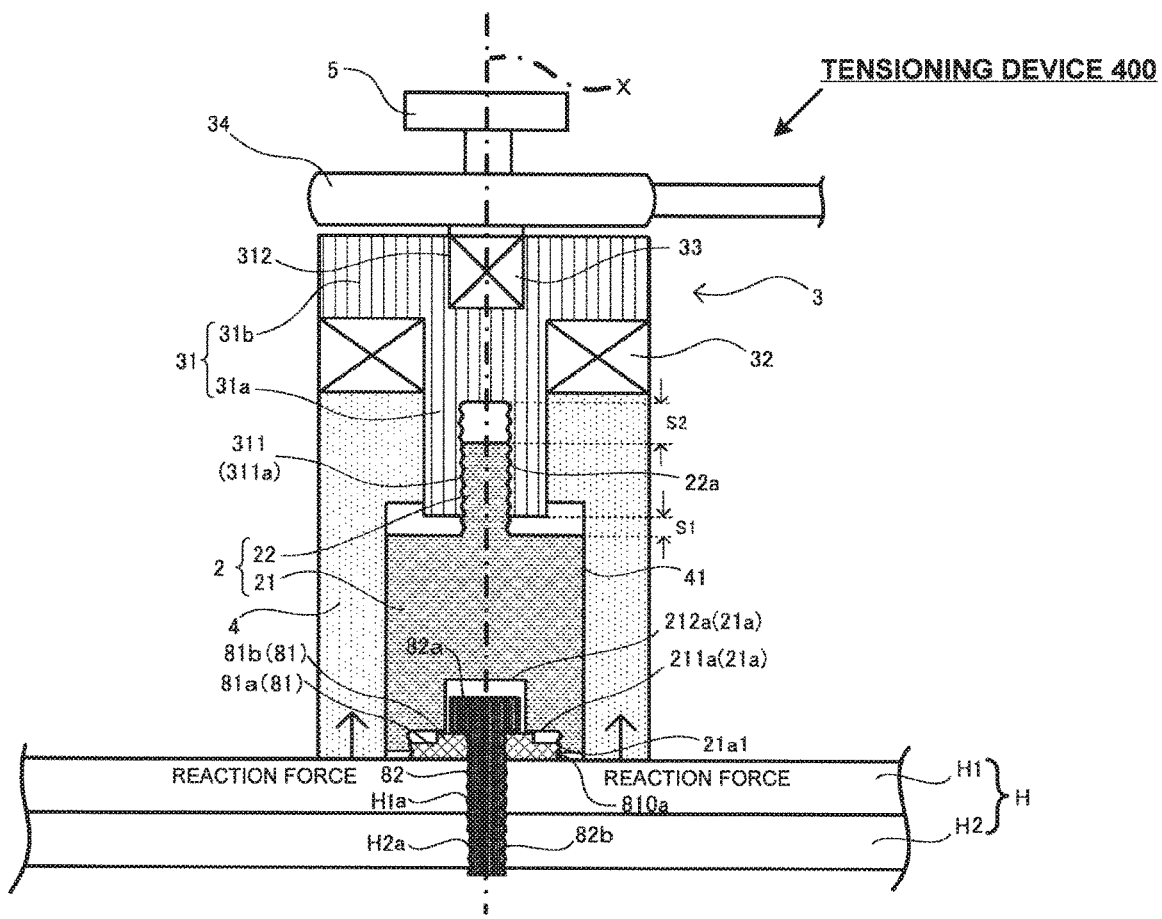
FIG. 7(b) is a schematic view of a tensioning device (first modified example of the fourth embodiment).

A tensioning device 400 of this modified example will be described referring to FIG. 7(b). FIG. 7(b) corresponding to FIG. 7(a) represents the state just after abutment of the tension bearer 4 on the fastened body H1. The small-diameter washer portion 81b of the washer 81 of this embodiment has an outer diameter dimension set to be larger than the one as described in the fourth embodiment.

When the connection member 2 is rotated around the rotation axis X so as to threadly engage the first male thread portion 810a and the first female thread portion 21a1, the connection member 2 will threadly advance downwardly. Further rotation of the connection member 2 around the rotation axis X brings the upper surface of the small-diameter washer portion 81b (including the concave or the convex portion formed on the upper surface of the small-diameter washer portion 81b, if any) into abutment on the large-diameter hollow portion 211a to make the connection member 2 unrotatable. In the embodiment, each size of the large-diameter hollow portion 211a and the small-diameter hollow portion 212a is set to satisfy the condition 1 (threaded engagement of the first female thread portion 21a1 with the first male thread portion 810a with its length equal to or longer than the single round of the outer circumferential surface of the washer 81) and the condition 2 (the clearance formed between the lower end of the connection member 2 and the fastened body H1) in abutment of the small-diameter washer portion 81b and the large-diameter hollow portion 211a (in other words, when the connection member 2 becomes no longer threadly advanceable). Accordingly, the conditions 1 and 2 may be easily satisfied. Each size of the large-diameter hollow portion 211a and the small-diameter hollow portion 212a of the connection member 2 may be set to satisfy the conditions 1 and 2 in abutment of the upper surface of the bolt head 82a (including the concave or the convex portion formed on the upper surface of the bolt head 82a, if any) on the small-diameter hollow portion 212a, or in abutment of the upper surface of the large-diameter washer portion 81a (including the concave or the convex portion formed on the upper surface of the large-diameter washer portion 81a, if any) on the large-diameter hollow portion 211a.

Second Modified Example of Fourth Embodiment

FIG. 8 is a perspective view of a washer of this modified example. A washer 91 is a rosette washer. A first male thread portion 910a is formed on an outer circumferential surface (side surface) of a lower end flat portion 91a. A dome-like upwardly extending curved portion 91b is formed on the lower end flat portion 91a. The curved portion 91b may be formed into a frustum-like shape.

In the modified example, as shown in FIG. 7(a) and FIG. 8, each size of the large-diameter hollow portion 211a and the small-diameter hollow portion 212a of the connection member 2 is set to satisfy the conditions 1 and 2 in abutment of the curved portion 91b of the washer 91 (in the case of the frustum shape, the tapered surface) and the large-diameter hollow portion 211a (in other words, when the connection member 2 becomes no longer threadly advanceable). Accordingly, the conditions 1 and 2 may be easily satisfied.

The concave or the convex portion formed on the curved portion 91b or the tapered surface may be considered as the abutment portion.

Fifth Embodiment

Figure 9:
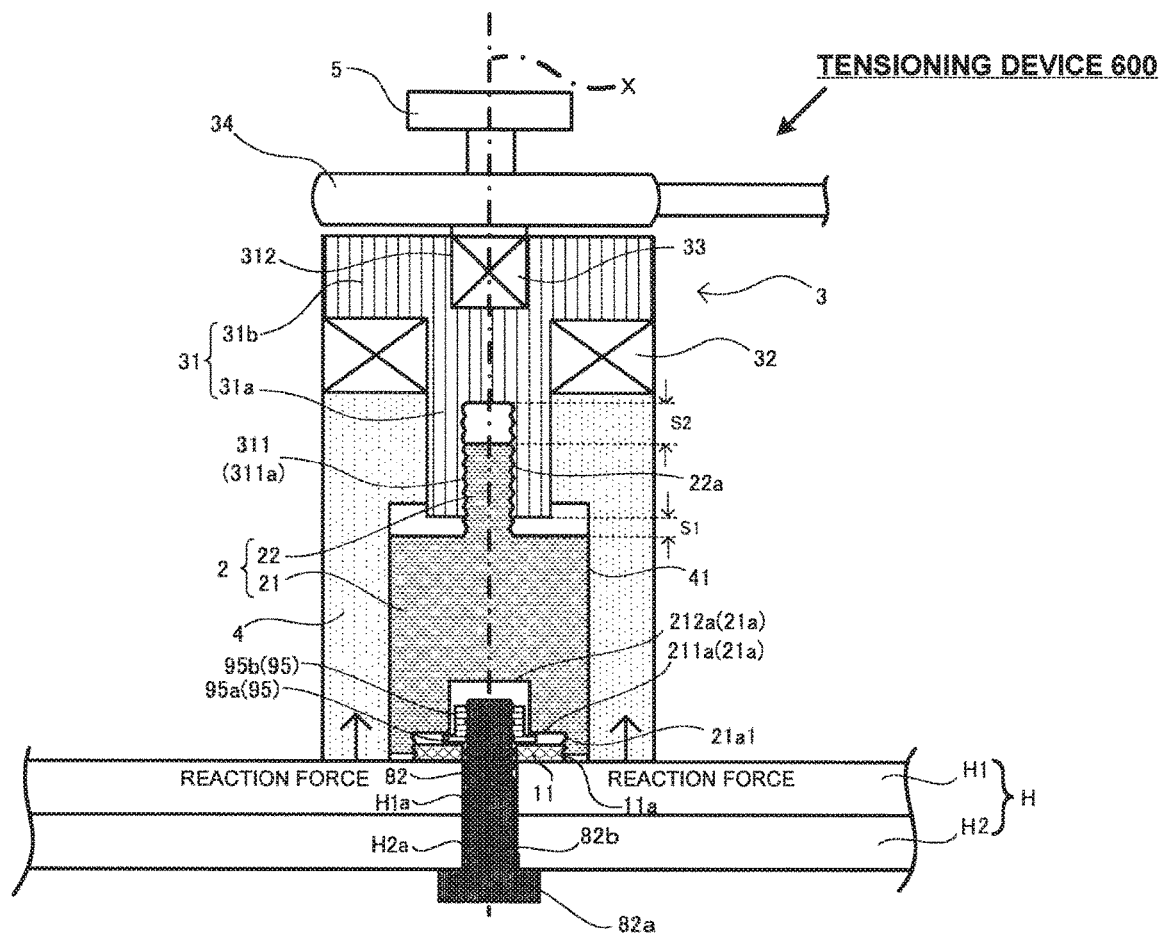
FIG. 9 is a schematic view of a tensioning device (fifth embodiment).
Figure 10:
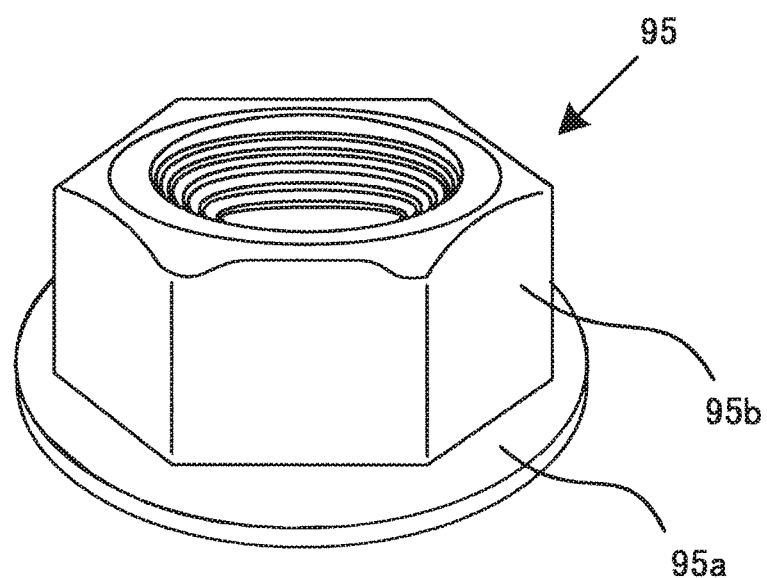
FIG. 10 is a perspective view of a nut (fifth embodiment).

A tensioning device 600 will be described referring to FIG. 9 and FIG. 10. FIG. 9 represents the state just after abutment of the tension bearer 4 on the fastened body H1. FIG. 10 is a perspective view of a nut 95 of this embodiment.

In this embodiment, the nut 95 and the connection member 2 are shaped differently from those of the fourth embodiment. The nut 95 as a flanged nut includes a nut flange 95a and a nut main body 95b. The nut flange 95a is radially and outwardly projecting from the lower end of the nut main body 95b. An outer diameter of the nut flange 95a is set to be smaller than that of the washer 11.

When the connection member 2 is rotated around the rotation axis X so as to threadly engage the first male thread portion 11a with the first female thread portion 21a1, the connection member 2 will threadly advance downwardly. Further rotation of the connection member 2 around the rotation axis X brings the upper surface of the nut flange 95a (including the concave or the convex portion formed on the upper surface of the nut flange 95a, if any) into abutment on the large-diameter hollow portion 211a to make the connection member 2 unrotatable. In the embodiment, each size of the large-diameter hollow portion 211a and the small-diameter hollow portion 212a is set to satisfy the condition 1 (threaded engagement of the first female thread portion 21a1 with the first male thread portion 11a with its length equal to or longer than the single round of the outer circumferential surface of the washer 11), and the condition 2 (the clearance formed between the lower end of the connection member 2 and the fastened body H1) in abutment of the nut flange 95a on the large-diameter hollow portion 211a (in other words, when the connection member 2 becomes no longer threadly advanceable). Accordingly, the conditions 1 and 2 may be easily satisfied. The connection member hollow portion 21a may be formed to satisfy the conditions 1 and 2 in abutment of the connection member hollow portion 21a on the top end surface of the bolt shaft 82b (including the concave or the convex portion formed on the top end surface of the bolt shaft 82b, if any), on the upper surface of the nut main body 95b (including the concave or the convex portion formed on the upper surface of the nut main body 95b, if any), or on the upper surface of the washer 11 (including the concave or the convex portion formed on the upper surface of the washer 11, if any)(in other words, when the connection member 2 becomes no longer threadly advanceable).

Modified Example of Fifth Embodiment

In the fifth embodiment, the nut flange 95a has a flat shape. The present invention is not limited to the above-described example, but applicable to any shape, instead of the flat shape, having the radially and outwardly extended diameter from the nut main body 95b. For example, the nut flange 95a may be formed to have a curved surface (or tapered surface) as shown in FIG. 8. In such a case, the large-diameter hollow portion 211a and the small-diameter hollow portion 212a of the connection member 2 may be shaped to satisfy the conditions 1 and 2 in abutment on the curved surface (or tapered surface) of the nut flange. The concave or the convex portion formed on the curved surface or the tapered surface, if any, may be considered as the abutment part. The curved surface (or tapered surface) of the nut flange corresponds to the part of the nut except the top ceiling surface.

Sixth Embodiment

Figure 11:
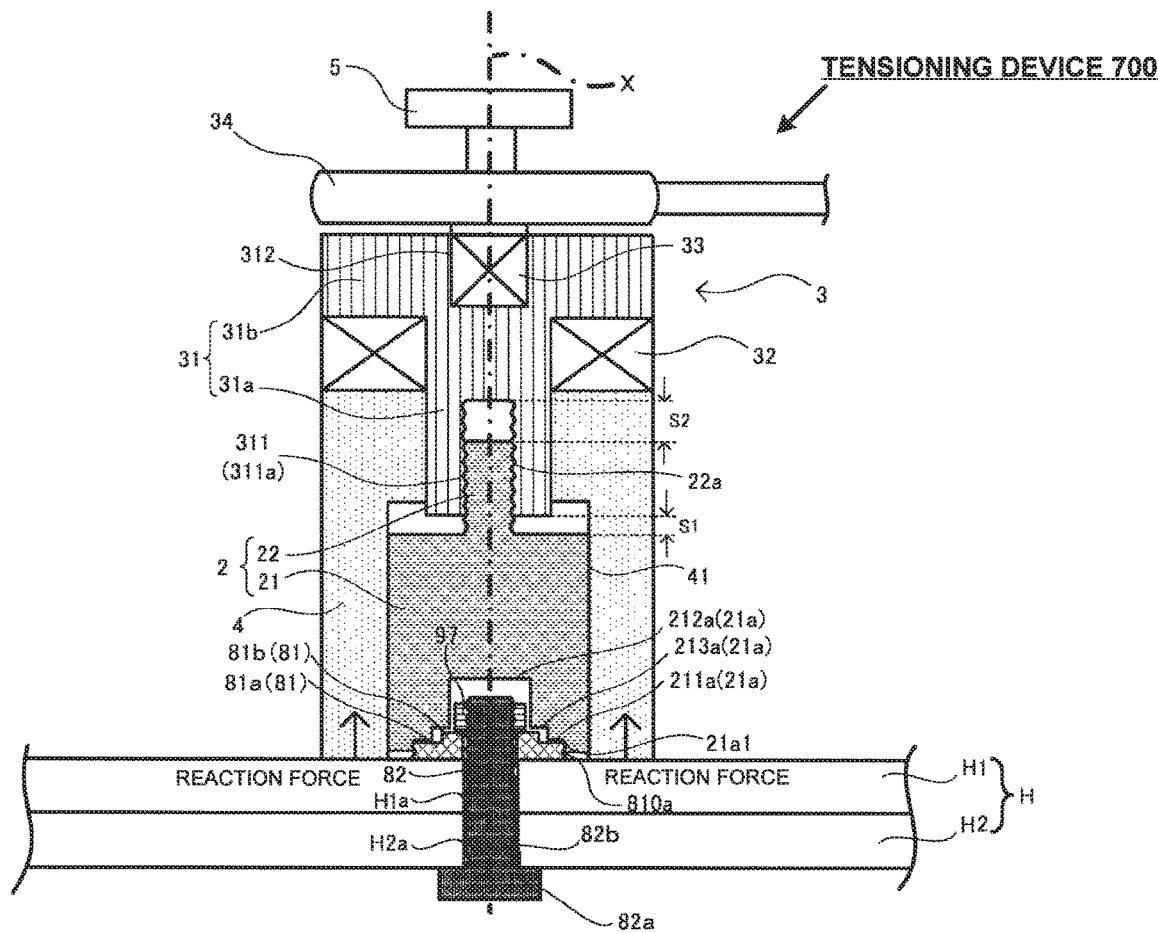
FIG. 11 is a schematic view of a tensioning device (sixth embodiment).

A tensioning device 700 of the embodiment will be described referring to FIG. 11. FIG. 11 represents the state just after abutment of the tension bearer 4 on the fastened body H1. In the embodiment, the nut and the washer are shaped differently from those of the fifth embodiment. In the embodiment, a nut 97 is not flanged, and the washer is similar to the washer 81 of the fourth embodiment. The connection member 2 of the embodiment includes a medium-diameter hollow portion 213a formed between the large-diameter hollow portion 211a and the small-diameter hollow portion 212a.

When the connection member 2 is rotated around the rotation axis X so as to threadly engage the first male thread portion 810a with the first female thread portion 21a1, the connection member 2 will threadly advance downwardly. Further rotation of the connection member 2 around the rotation axis X brings the upper surface of the large-diameter washer portion 81a (including the concave or the convex portion formed on the upper surface of the large-diameter washer portion 81a, if any) into abutment on the large-diameter hollow portion 211a to make the connection member 2 unrotatable. In the embodiment, each size of the large-diameter hollow portion 211a, the small-diameter hollow portion 212a, and the medium-diameter hollow portion 213a is set to satisfy the condition 1 (threaded engagement of the first female thread portion 21a1 with the first male thread portion 810a with its length equal to or longer than the single round of the outer circumferential surface of the washer 81) and the condition 2 (the clearance formed between the lower end of the connection member 2 and the fastened body H1) in abutment of the large-diameter washer portion 81a on the large-diameter hollow portion 211a (in other words, when the connection member 2 becomes no longer threadly advanceable). Accordingly, the conditions 1 and 2 may be easily satisfied. The connection member hollow portion 21a may be formed to satisfy the conditions 1 and 2 in abutment of the connection member hollow portion 21a on the top end surface of the bolt shaft 82b (including the concave or the convex portion formed on the top end surface of the bolt shaft 82b, if any), on the upper surface of the nut 97 (including the concave or the convex portion formed on the upper surface of the nut 97, if any), or on the upper surface of the small-diameter washer portion 81b (including the concave or the convex portion formed on the upper surface of the small-diameter washer portion 81b, if any) (in other words, when the connection member 2 becomes no longer threadly advanceable).

First Modified Example of Sixth Embodiment

Referring to FIG. 11, each size of the large-diameter hollow portion 211a, the small-diameter hollow portion 212a, and the medium-diameter hollow portion 213a of the connection member 2 may be set to satisfy the conditions 1 and 2 when the large-diameter hollow portion 211a is made higher to bring the upper surface of the small-diameter washer portion 81b (including the concave or the convex portion formed on the upper surface of the small-diameter washer portion 81b, if any) into abutment on the medium-diameter hollow portion 213a.

Seventh Embodiment

Figure 12:
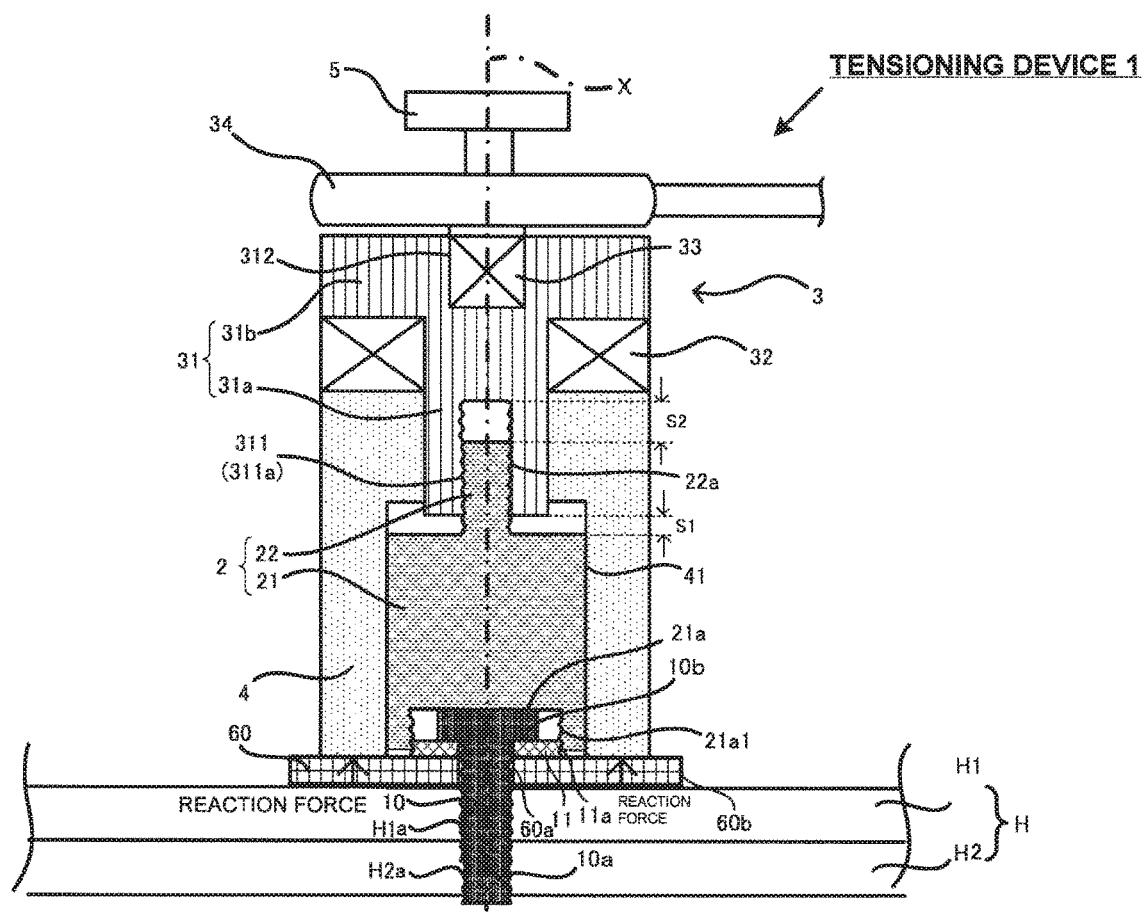
FIG. 12 is a schematic view of a tensioning device (seventh embodiment).

A seventh embodiment will be described referring to FIG. 12. FIG. 12 represents the state just after abutment of the tension bearer 4 on a protection plate 60. That is, the protection plate 60 may be intervened between the washer 11 and the tension bearer 4, and the fastened body H1. The protection plate 60 with a ring-like shape has an inner edge portion 60a at a position corresponding to the bolt shaft 10a, and an outer edge portion 60b at a position radially protruding from an outer edge of the tension bearer 4. Rotation of the handle 5 moves down the tension bearer 4 so as to abut on the protection plate 60 instead of the fastened body H1. In this case, the reaction force applied from the fastened body H1 in the axial force detection is transmitted to the tension bearer 4 via the protection plate 60.

This embodiment is especially preferable to the case where rigidity (EI) and resilient limit strength of the fastened member H are lower than those of the tension bearer 4. The "E" denotes Young's modulus, and "I" denotes the cross-sectional secondary moment. Specifically, upon detection of the axial force by abutting the tension bearer 4 on the fastened body H1, the load is concentratedly exerted to the abutment part of the fastened body H1. In the above-described case, the low rigidity of the fastened body H1 may cause the risk of deformation thereof. The embodiment employs the protection plate 60 with the diameter dimension larger than the outer diameter of the tension bearer 4, which is interposed between the tension bearer 4 and the fastened body H1 so that the abutment area is increased to distribute the load, resulting in reduced load exerted to the fastened member H.

The protection plate 60 may be made of the material (heat treated steel material, for example) with higher rigidity (EI) and higher resilient limit strength than those of the fastened member H. Detection of the reaction force via the protection plate 60 with higher rigidity (EI) may reduce detection error of the axial force detection.

First Modified Example of Seventh Embodiment

Figure 13:
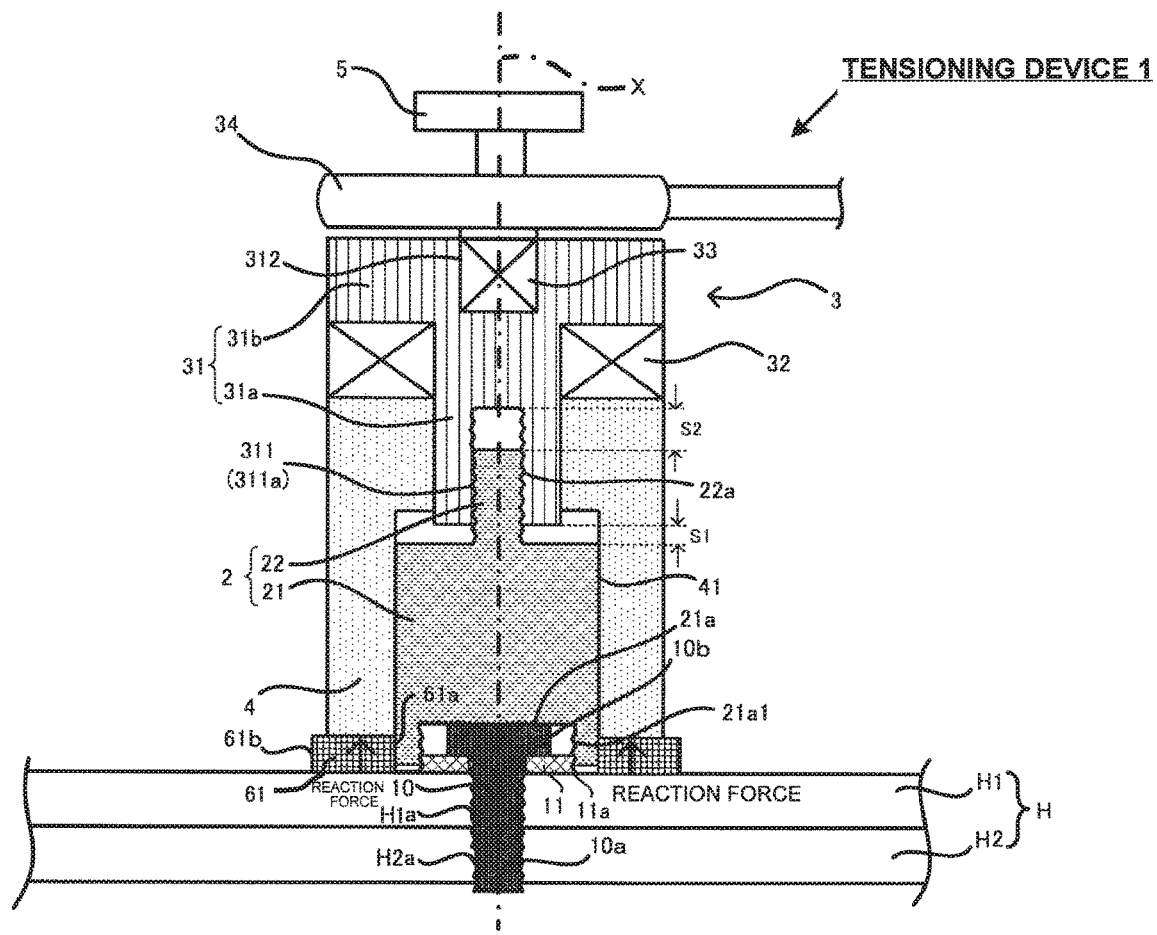
FIG. 13 is a schematic view of a tensioning device (first modified example of the seventh embodiment).

FIG. 13 shows a modified example of the protection plate. A protection plate 61 formed to have a ring-like shape (an arbitrary shape other than the ring-like shape is available) is intervened between the tension bearer 4 and the fastened body H1 so as not to be located just below the washer 11. The protection plate 61 has an inner edge portion 61a at a position corresponding to the inner edge portion of the tension bearer 4, and an outer edge portion 61b at a position radially protruding from the outer edge portion of the tension bearer 4. The similar advantageous effects to those of the second embodiment may be derived from the example. In this example, adjustment of the thickness of the protection plate 61 in the radial direction may substantially equalize a deformation amount of the fastened body H1 just below the washer 11 to that of the fastened body H1 just below the protection plate 61. Specifically, assuming that the deformation amount of the fastened body H1 just below the washer 11 before starting tensioning by the tensioning mechanism 3 is S1, and the deformation amount of the fastened body H1 just below the protection plate 61 after starting tensioning by the tensioning mechanism 3 is S2, it is preferable to preliminarily adjust the area of the protection plate 61 in contact with the fastened body H1 so that the deformation amounts S1 and S2 are substantially equalized. Each of the deformation amounts S1 and S2 refers to the deformation amount of the bolt 10 in the axial direction. The protection plate 61 may be provided as a part of the tension bearer 4. In this case, it is preferable to adjust the contact area of the abutment part (in other words, the lower end) of the tension bearer 4 in contact with the fastened body H1 to satisfy the above-described condition. The appropriate contact area may be obtained through preliminary experiment or simulation.

An explanation will be made with respect to advantageous effects derived from substantially equalizing the deformation amounts. Tensioning the washer 11 will release the deformation amount when tightening the fastened body H1 just below the washer 11 (in other words, the fastened body just below the washer 11 becomes nearly in the no-load state). In order to retain the deformed state resulting from tensioning the washer 11, the fastened body H1 is kept deformed with the protection plate 61 likewise the tightened state so as to improve the axial force detection accuracy.

It is to be clearly understood that structures of the seventh embodiment and the first modified example thereof are applicable to any other embodiments and modified examples thereof.

The following inventions 1 and 2 have been exemplified by the above-described embodiments.

Invention 1

A tensioning device is configured to tension a bolt fastened to the fastened member, and insertedly fitted with a washer. A first male thread portion is formed on an outer circumferential surface of the washer. The device includes a connection member having a ceiled cylindrical connection member hollow portion in the lower end, and a first female thread portion to be threadly engaged with the first male thread portion on the inner circumferential surface of the connection member hollow portion except the ceiling surface, a tensioning mechanism which applies tension to the connection member in the state where the first male thread portion is threadly engaged with the first female thread portion, and a tension bearer disposed around the outer circumference of the connection member, and bears the reaction force applied from the fastened member in the tension state brought by the tensioning mechanism. At a timing for starting the tensioning by threadly engaging the first male thread portion and the first female thread portion, the bolt or the washer is brought into contact with the connection member so as to satisfy the predetermined tensioning start conditions. Specifically, the conditions include threaded engagement between the first female thread portion and the first male thread portion with its length equal to or longer than the single round of the outer circumferential surface of the washer, and the clearance formed between the lower end of the connection member and the fastened member.

Invention 2

A tensioning device is configured to tension a bolt fastened to the fastened member, and insertedly fitted with a washer and a nut. A first male thread portion is formed on an outer circumferential surface of the washer. The device includes a connection member having a ceiled cylindrical connection member hollow portion in the lower end, and a first female thread portion to be threadly engaged with the first male thread portion on the inner circumferential surface of the connection member hollow portion except the ceiling surface, a tensioning mechanism which applies tension to the connection member in the state where the first male thread portion is threadly engaged with the first female thread portion, and a tension bearer disposed around the outer circumference of the connection member, and bears the reaction force applied from the fastened member in the tension state brought by the tensioning mechanism. The washer is clamped between the nut and the fastened member. At a timing for starting the tensioning by threadly engaging the first male thread portion and the first female thread portion, any one of the nut, the bolt and the washer is brought into contact with the connection member so as to satisfy the predetermined tensioning start conditions. Specifically, the conditions include threaded engagement between the first female thread portion and the first male thread portion with its length equal to or longer than the single round of the outer circumferential surface of the washer, and the clearance formed between the lower end of the connection member and the fastened member.

REFERENCE SIGNS LIST

1 100 tensioning device
2 connection member
3 tensioning mechanism
4 tension bearer
5 handle
10 13 bolt
10*a* 13*a* bolt shaft
10*b* 13*b* bolt head
11 washer
11*a* first male thread portion
13*c* bolt flange
21 column portion
21*a* connection member hollow portion
21*a*1 first female thread portion
22 convex portion
22*a* second male thread portion
31 tension rod
31*a* small-diameter rod portion
31*b* large-diameter rod portion
32 bearing
33 angle drive
34 wrench
50 nut
311 tension rod hollow portion
311*a* second female thread portion
H(H1, H2) fastened member

The invention claimed is:
1. A tensioning device which applies upward tension to a bolt fastened to a fastened member and insertedly fitted with a washer, the washer having a first male thread portion formed on an outer circumferential surface, the tensioning device comprising:
a connection member having a first female thread portion to be threadly engaged with the first male thread portion;
a tensioning mechanism which tensions the connection member while having the first male thread portion threadly engaged with the first female thread portion; and
a tension bearer which is disposed around an outer circumference of the connection member, and bears a reaction force applied from the fastened member in tensioning performed by the tensioning mechanism.
2. The tensioning device according to claim 1, wherein:
the tensioning mechanism includes a tension rod, a bearing which rotatably supports the tension rod around a vertically extending shaft portion, and a rotation mechanism serving to rotate the tension rod around the shaft portion;

a convex portion having a second male thread portion formed on an outer circumferential surface is disposed on an upper end of the connection member; and a hollow portion having a second female thread portion to be threadly engaged with the second male thread portion on an inner circumferential surface is formed in a lower end of the tension rod.

3. The tensioning device according to claim 2, wherein the tension bearer is vertically interposed between the bearing and the fastened member.

4. The tensioning device according to claim 2, wherein the convex portion has an axial diameter which is substantially the same as that of the bolt, and a friction torque reducing agent for reducing a friction torque is applied to the second male thread portion and the second female thread portion.

5. The tensioning device according to claim 1, wherein a tensile strength of the connection member is higher than that of the bolt.

6. The tensioning device according to claim 1, wherein the first male thread portion has a length equal to or longer than a single round of an outer circumferential surface of the washer.

7. The tensioning device according to claim 1, comprising a protection plate which intervenes between the tension bearer and the fastened member in tensioning performed by the tensioning mechanism.

8. The tensioning device according to claim 7, wherein a contact area of the protection plate with the fastened member is adjusted so that a deformation amount S1 of the fastened member just below the washer before starting tensioning by the tensioning mechanism is substantially equalized to a deformation amount S2 of the fastened member just below the protection plate after starting tensioning by the tensioning mechanism.

9. The tensioning device according to claim 1, wherein a contact area of the tension bearer with the fastened member is adjusted so that a deformation amount S1 of the fastened member just below the washer before starting tensioning by the tensioning mechanism is substantially equalized to a deformation amount S2 of the fastened member just below the tension bearer after starting tensioning by the tensioning mechanism.

* * * * *